Aug. 22, 1944.    F. W. SCHWINN    2,356,540
APPARATUS FOR ASSEMBLING BICYCLES
Filed Sept. 21, 1940    8 Sheets-Sheet 1
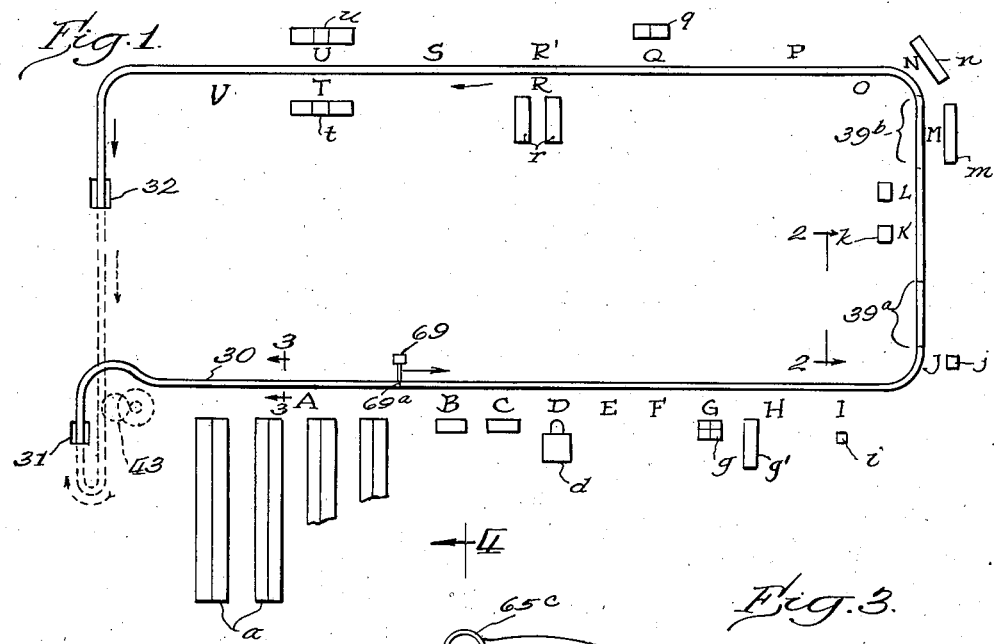
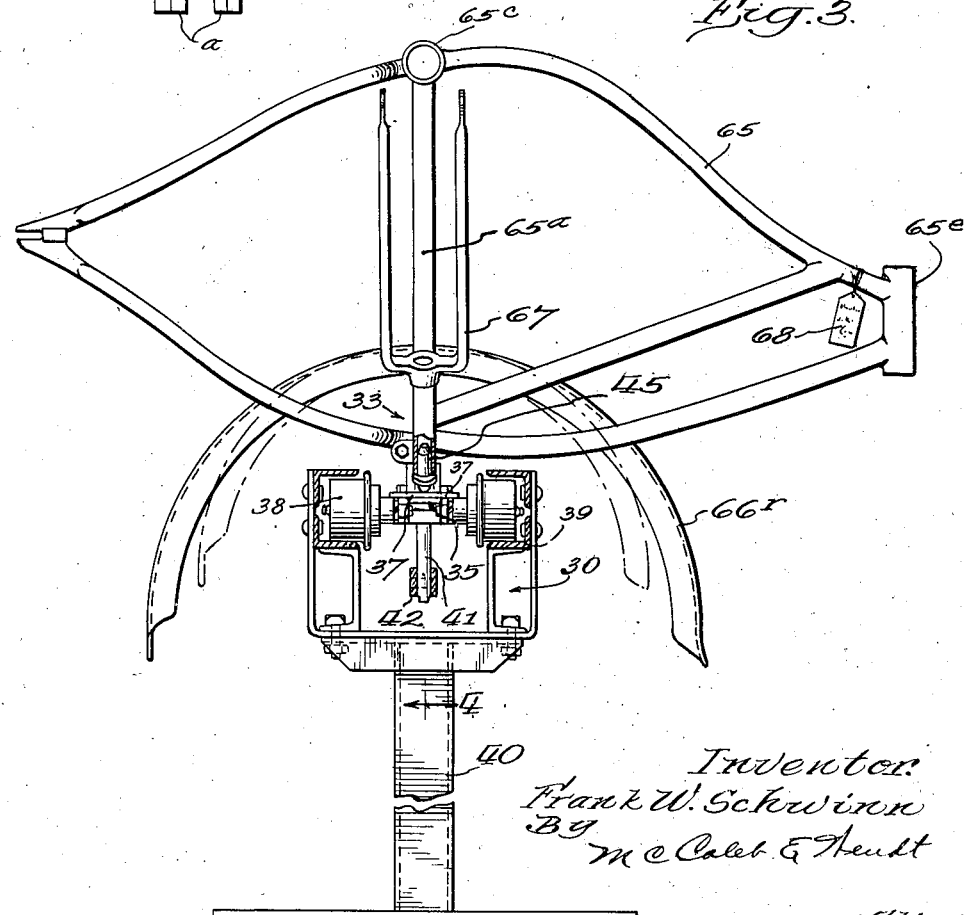
Inventor:
Frank W. Schwinn
By McCaleb & Hendt
Attys.

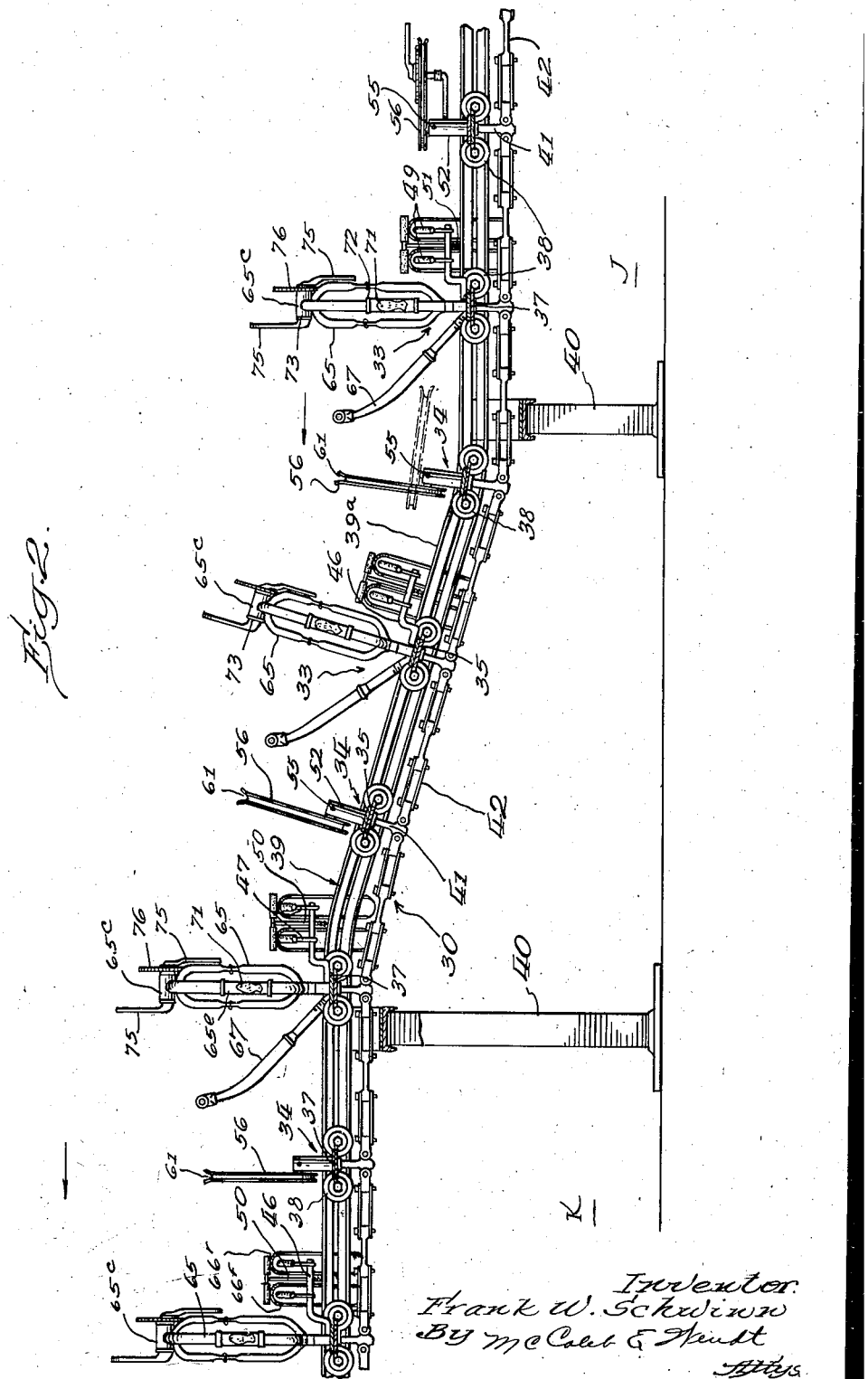

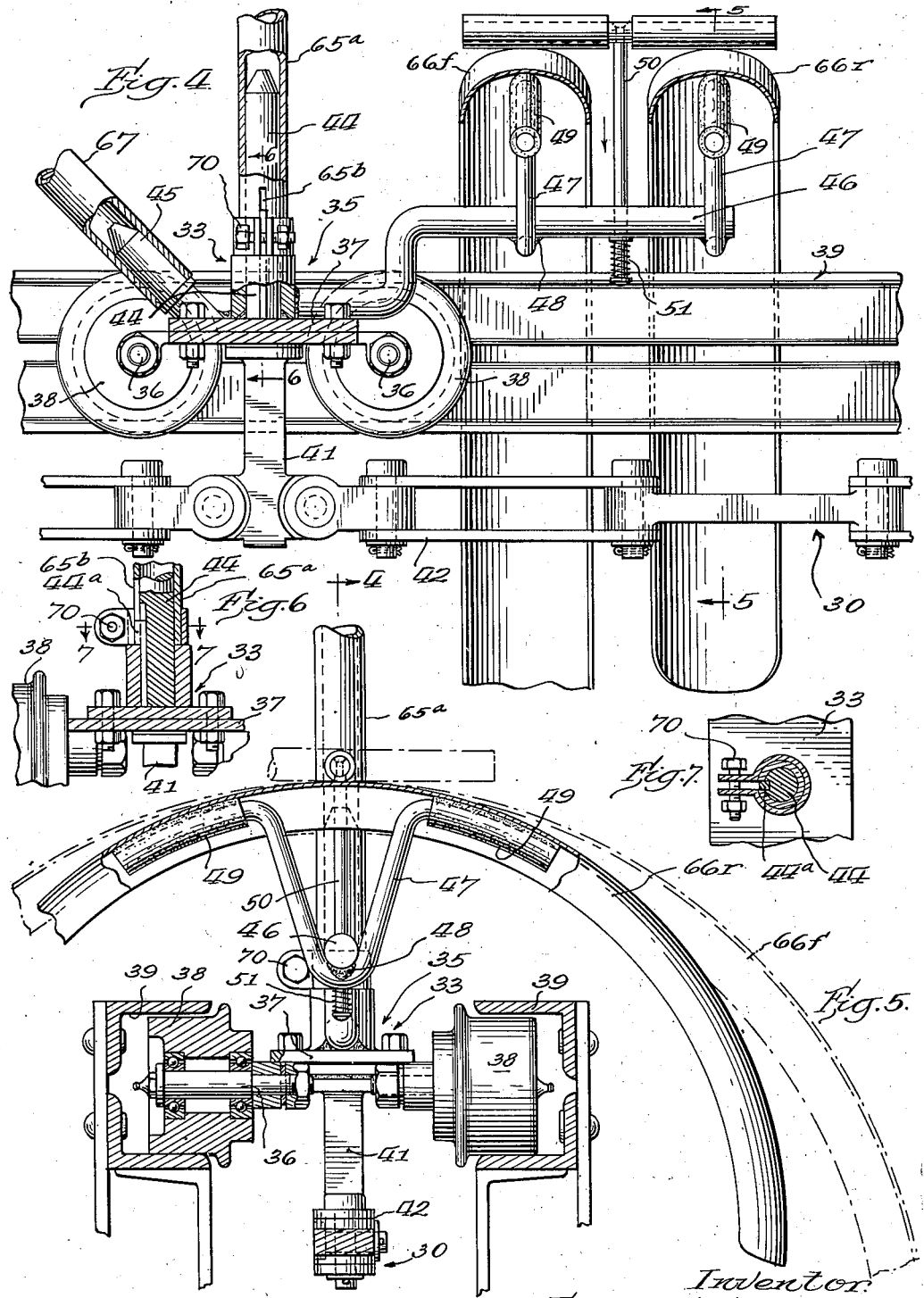

Aug. 22, 1944.  F. W. SCHWINN  2,356,540
APPARATUS FOR ASSEMBLING BICYCLES
Filed Sept. 21, 1940  8 Sheets-Sheet 4
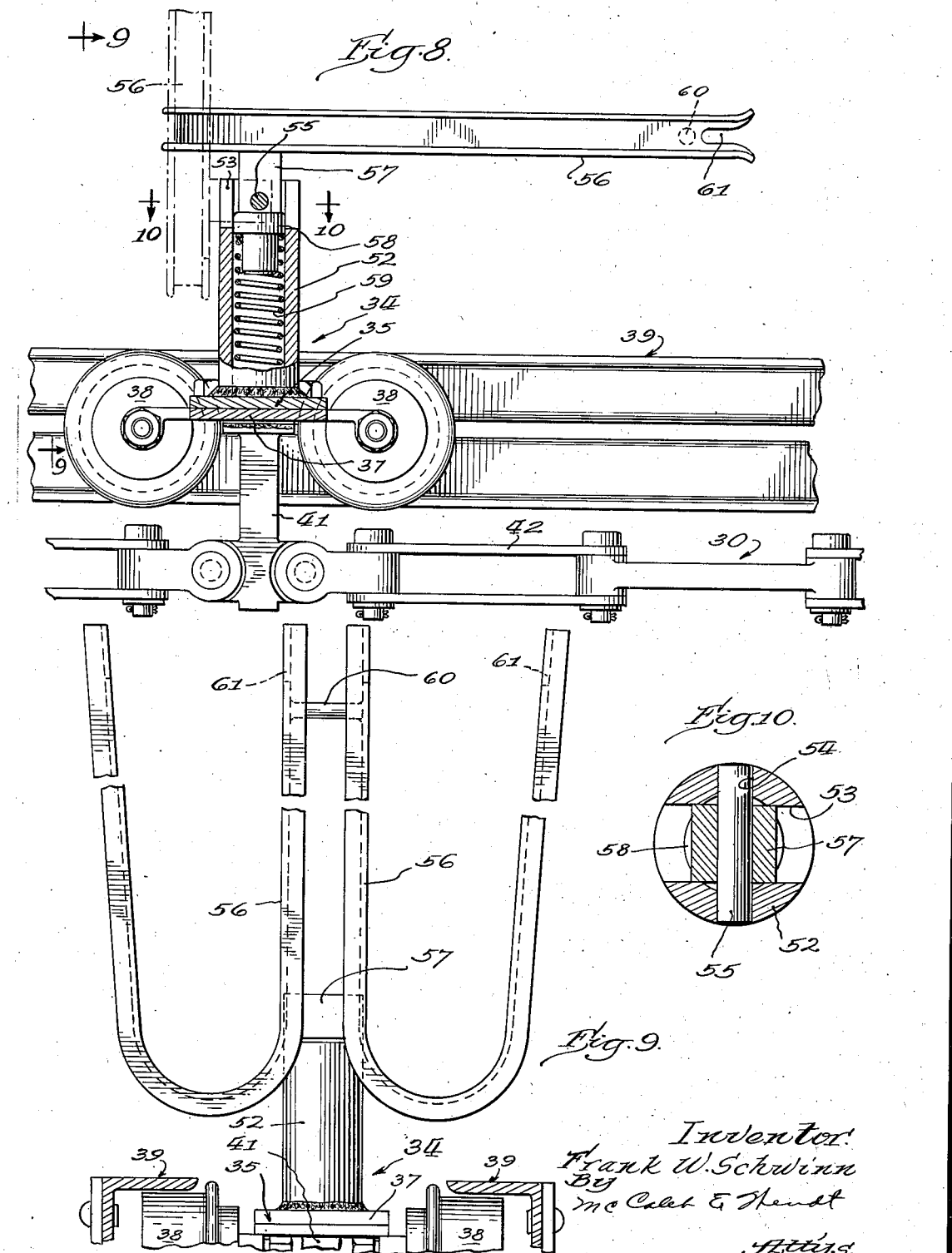

Aug. 22, 1944.  F. W. SCHWINN  2,356,540
APPARATUS FOR ASSEMBLING BICYCLES
Filed Sept. 21, 1940   8 Sheets-Sheet 5
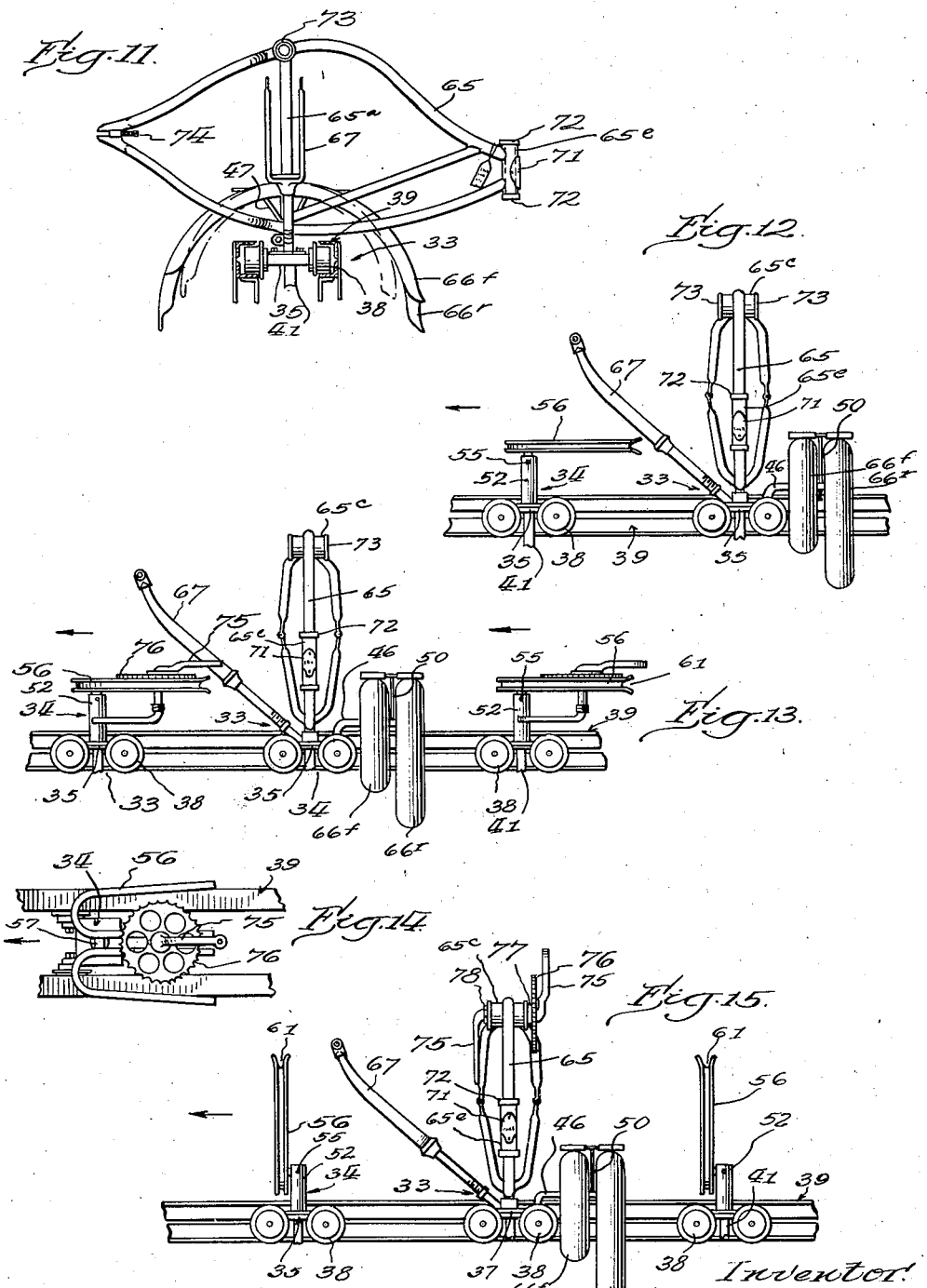

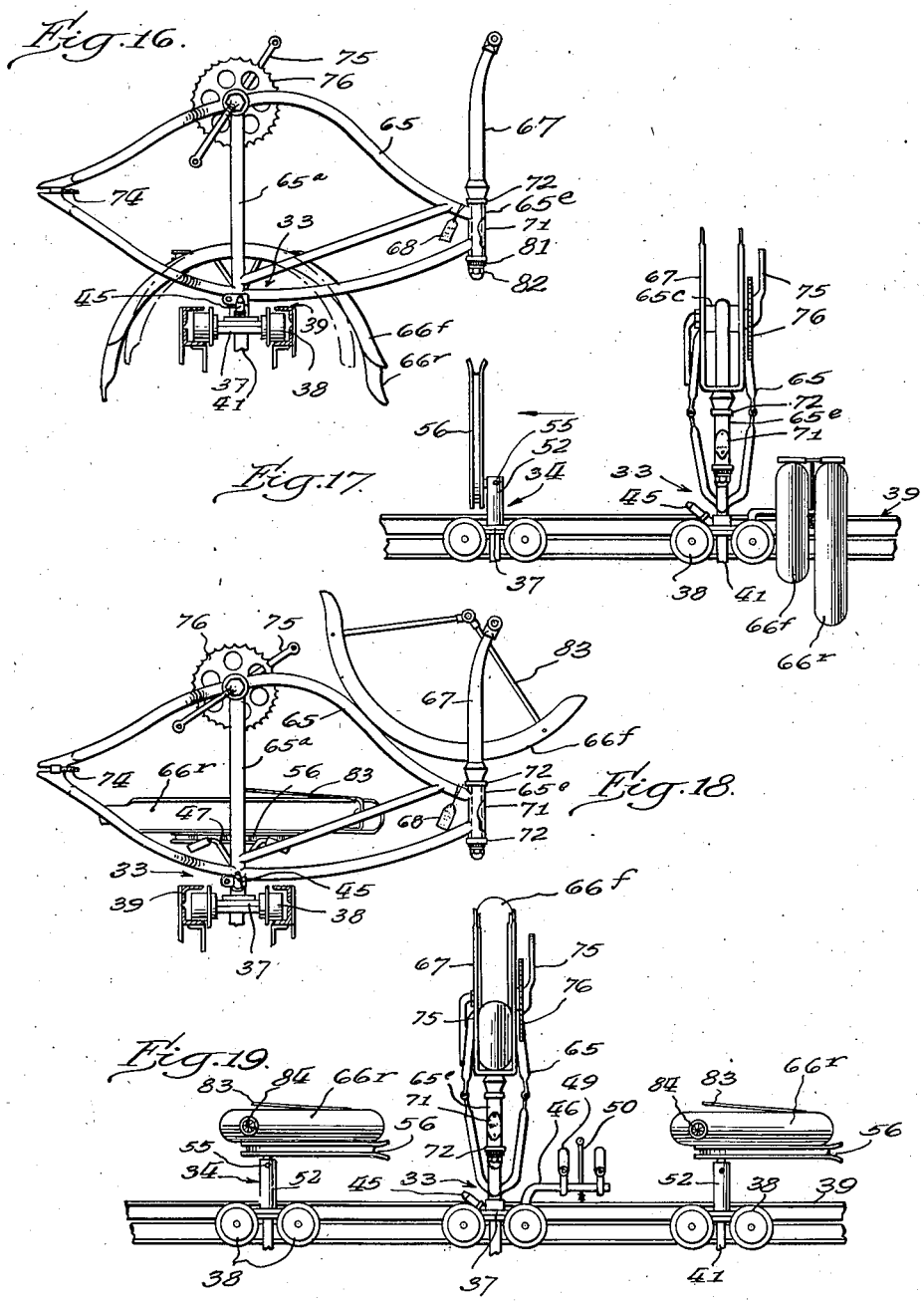

Aug. 22, 1944.  F. W. SCHWINN  2,356,540
APPARATUS FOR ASSEMBLING BICYCLES
Filed Sept. 21, 1940  8 Sheets-Sheet 7
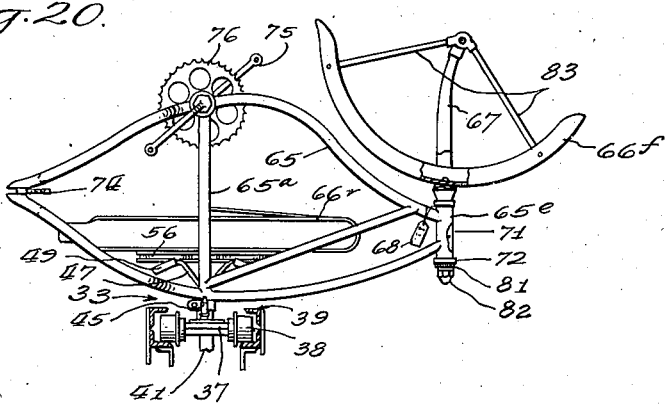
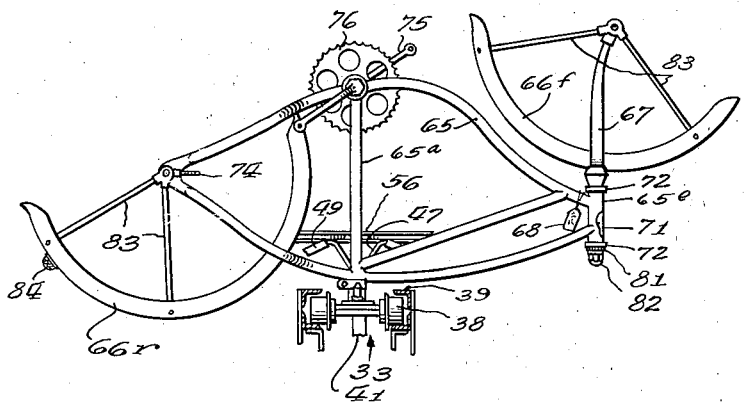
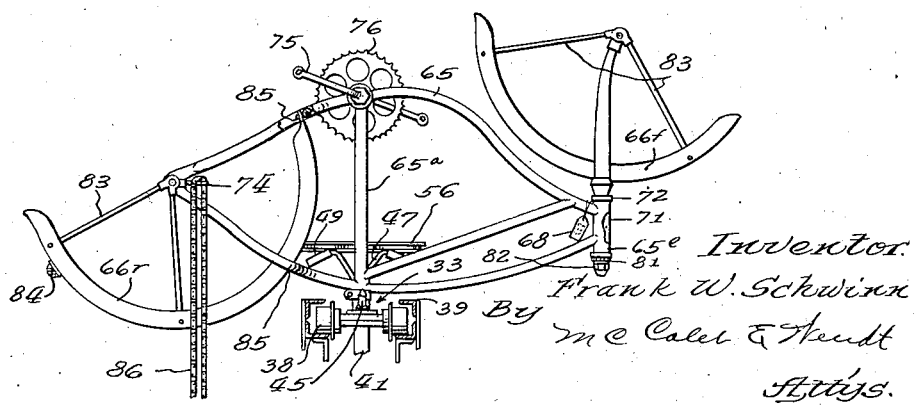
Inventor.
Frank W. Schwinn
By McCaleb & Wendt
Attys.

Aug. 22, 1944.   F. W. SCHWINN   2,356,540
APPARATUS FOR ASSEMBLING BICYCLES
Filed Sept. 21, 1940   8 Sheets—Sheet 8

Inventor:
Frank W. Schwinn
By McCaleb & Hewitt
Attys

Patented Aug. 22, 1944

2,356,540

UNITED STATES PATENT OFFICE 2,356,540

APPARATUS FOR ASSEMBLING BICYCLES

Frank W. Schwinn, Chicago, Ill.

Application September 21, 1940, Serial No. 357,728

15 Claims. (Cl. 198—131)

My invention relates to apparatus for assembling bicycles.

While assembly line production, employing a constantly moving traveling conveyer, has been extensively used in the assembly of automobiles and other devices, it has not been brought into commercial use for the assembly of bicycles, largely because of difficulties which would be involved in the application of the principles of assembly line production to bicycles specifically. One of these difficulties is that certain of the parts, such as the front forks and the fenders, and sometimes the wheels, must be of the same color and type as the frames, and unless a large run is to be made of one particular model and color, it would not be feasible to rack, for ready selection by workmen along the assembly line, such supplies of a large assortment of such parts which have to be matched.

Another difficulty is that some of the operations which have to be performed upon the bicycle frame are not of a nature which can very well be accomplished on a conveyer, but should be performed on rather heavy fixed machines.

Still another difficulty has been that it has not been good manufacturing practice to run through, on estimate, large runs of certain specifications of bicycles of certain color, model and set of accessories, rather than assembling the bicycles more or less to order as regards specifications, pursuant to orders as they are received. An assembly line system according to conventional methods would not be well adapted to meet this situation. Another disadvantage has been that bicycle frames are rather narrow and if placed on a usual assembly line, the workman would have to be leaning too far over the conveyer in order to get to the center of the conveyer, where the bicycle frame would be, in order to work upon it.

By my invention, I have provided a method and apparatus for assembly line production of bicycles which overcome these difficulties and solve these problems, which have stood in the way of application to bicycles of the principles of assembly line production.

By the system I have devised, bicycles may be assembled, pursuant to the varying specifications of shop orders as they are received—and, in fact, in the order in which they are received— along a continuous assembly line starting with the shop order and terminating with the assembled bicycle, with each bicycle according to its peculiar specifications. And this without cluttering up the installation stations along the assembly line with large areas of supply racks which would be necessary to accommodate the necessary supplies of a large assortment of colors and types of component parts.

The conveyer and its track, which is used in carrying out my system, are extremely simple and occupy but very little space, and that space is so located as not substantially to interfere with the assembly work nor with a free floor space. Also, the bicycle frames, whereon the component parts are installed, are disposed in such a way that the frame is rigid as against forces applied in various directions in the course of assembly operations, but yet the frame is positioned where it is very easy of access from all sides and where the workmen may walk along forwardly, instead of having to sidestep or walk backwardly.

When any operations are to be performed upon the frame or component parts carried along with the frame for subsequent installations, the frame or those parts may be removed from the conveyer for the performance of those operations at fixed machines or benches, without losing the location on the conveyer, or the identity, of the bicycle in which they are to be combined.

Another feature of my assembly line system is that the assembly line may take the form of a horizontal loop, whereby the length of the assembly line need not be a continuous straight line requiring an abnormally long building, but where a passageway at floor level is still available for trucking parts to workmen's stations within the loop.

Further objects, features and advantages of my invention are set forth in the following description and the accompanying illustrations of a specific embodiment thereof. Many of the figures show the bicycle in various stages of assembly at respective of the successive workman stations past which the conveyer passes. In the drawings:

Fig. 1 is a diagrammatic plan of the circuit traversed by the conveyer and the several workman stations along the circuit;

Fig. 2 is a side elevation of the conveyer and bicycle parts carried thereby which may be considered as taken on the line 2—2 of Fig. 1 at station K and at stations immediately preceding it;

Fig. 3 is a transverse section of the conveyer taken on the line 3—3 at station A, showing one of the frame-carrying units of the conveyer with the conveyer moving toward the reader;

Fig. 4 is a vertical longitudinal section (that is, a section longitudinally of the conveyer), taken on the line 4—4 of Fig. 5;

Fig. 5 is a transverse section taken on the line 5—5 of Fig. 4;

Fig. 6 is a transverse vertical detail section taken on the line 6—6 of Fig. 4, showing the conveyer-carried peg for mounting the bicycle frame;

Fig. 7 is a detail plan section thereof taken on the line 7—7 of Fig. 6;

Fig. 8 is a fragmentary vertical longitudinal medial section of one of the wheel-carrying units of the conveyer;

Fig. 9 is a transverse vertical section of the wheel-carrying unit of Fig. 8 taken on the line 9—9 of Fig. 8, but showing the wheel-carrying arm swung to vertical position;

Fig. 10 is a plan section taken on the line 10—10 of Fig. 8;

Figs. 11 and 12 are transverse and side elevations of a conveyer section (comprising a frame-carrying unit and a wheel-carrying unit) at station F, Fig. 11 being very similar to Fig. 3;

Figs. 13 and 14 are a side elevation of a section of the conveyer and a fragmentary plan of the wheel-carrying unit, at station H;

Fig. 15 is a side elevation of a conveyer section at station I;

Figs. 16 and 17 are transverse and side elevations of a section of the conveyer at station K;

Figs. 18 and 19 are transverse and side elevations of a section of the conveyer at station N;

Fig. 20 is a transverse elevation of a conveyer unit at station O;

Fig. 21 is a transverse elevation of a conveyer unit at station P;

Fig. 22 is a transverse elevation of a conveyer unit at station Q;

Figure 23:
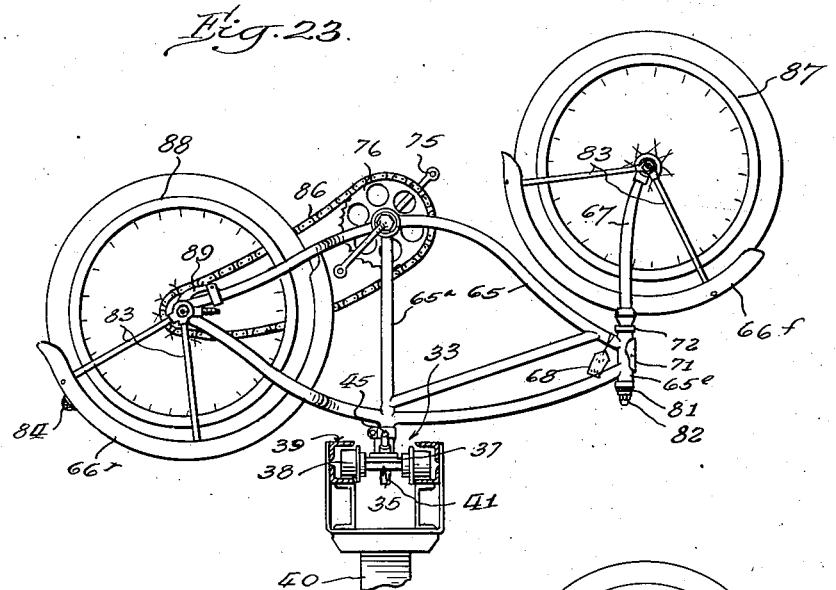
Fig. 23 is a transverse elevation of a conveyer unit at station R.

An endless conveyer 30 is installed in the assembly room of a bicycle factory to traverse a circuit, as indicated in Fig. 1, past workman stations A to V inclusive. In general, there would be one workman assigned to each station, but it may be expedient to have a plurality of adjoining stations served by one workman, or to have more than one workman at a single station. Geographically, the stations may be somewhat overlapping, since for many of the operations the workman will walk along with the movement of the conveyer until his operation is completed. At the several stations there will be parts bins or racks, fixed or hand tools, and the like, as circumstances may require, and as will become clearer during the course of this specification.

From the point 31 to the point 32, the conveyer 30 is supported at such height above the floor as will present the conveyer-carried parts, in the course of assembly, at a height above the floor which will be convenient for the workmen at the several stations. But at the point 32 the conveyer, which there is empty, is carried downwardly beneath the floor level and continues to the point 31, where it again rises up to its normal height above the floor. This gives a floor-level passageway, between the points 31 and 32, through which workmen may walk, and parts supply trucks may be wheeled, to workman stations which are on the inside of the conveyer circuit.

The conveyer 30 comprises a series of conveyer sections, each conveyer section, throughout its circuit, being assigned to a given bicycle for the assembly thereof.

Each conveyer section comprises a frame-carrying unit 33 and a wheel-carrying unit 34, which can best be visualized from Fig. 2. Each conveyer unit 33 or 34 comprises, and is supported by, a truck or carriage 35, as shown in Figs. 3, 4, and 5. Each carriage 35 includes, upon each side of the vertical longitudinal center plane, a pair of horizontal longitudinally spaced stud axles 36 extending outwardly from a central body 37. Upon each stud axle 36 a small car wheel 38 is mounted. Thus, each unit has four wheels which give it stability against rocking in any direction.

The wheels 38 run in inwardly facing channel tracks 39, one on each side of the center line of the conveyer. The bottom and top flanges of the track 39 leave but little clearance for the wheels, so that the carriage is precluded from appreciable up, down, or rocking movement. The wheel flanges will contact the inner edges of the channel track flanges to maintain the carriage against appreciable lateral shifting. But yet the carriage wheels are not so tightly bound in the tracks but that the carriages can take up or down or lateral turns. The channel tracks 39 are supported at spaced intervals by standards 40 extending upwardly from the floor. The standards 40 are confined to the central vertical planes of the conveyer so that they present minimum interference with toe room for the workmen walking near the conveyer.

An arm 41 depends from the body 37 of each carriage 35. These depending arms 41 are connected into a conveyer chain 42 at spaced intervals—in practice about two feet—therealong. The conveyer chain 42 travels centrally between, but somewhat below, the channel tracks 39 and between the bifurcations of the more or less Y shaped heads of the standards 40 (Fig. 3). The conveyer chain 42 is thus suspended from, and carried by, the carriages 35, which in turn run in the stationary channel tracks 39.

The conveyer is caused to move, in the direction indicated by the arrows in Fig. 1, and at a speed equivalent to a very slow walk, by means of a motor driven horizontally disposed sprocket, as indicated at 43, which may be placed at that reach of the circuit which is beneath the floor.

As thus far described, the carriage 35 for a frame-carrying unit 33 of the conveyer is the same as that for a wheel-carrying unit 34. The carriages differ by their upwardly presented parts.

The carriage 35 of each frame-carrying unit 33 carries an upwardly extending peg 44 preferably aligned with the vertical axis of the carriage. The peg 44 is of a size to be received, with a reasonably close fit, within the seat post mast of an inverted bicycle frame. A short distance above its base the peg 44 carries a radial key 44a (Figs. 6 and 7) disposed in a plane transverse to the conveyer.

A fork mounting peg 45, also fixedly carried by the body of the carriage, extends at a forward and upward inclination of about forty-five degrees. The body of the carriage of the unit 33 also carries a horizontal rearwardly extending beam 46 which is preferably upwardly offset two or three inches. Fender supporting rods 47 are disposed in transverse vertical planes and spaced longitudinally of the beam 46, as shown in Fig. 4. These fender supporting rods 47, as shown in Fig. 5, are V shaped and fixed to the beams 46, which lie in their bights, by welds 48. The upper ends of the V-shaped fender supporting rods 47 are turned outwardly—transversely of the conveyer—along arcs conforming to the arc of the fenders. These offset ends may be jacketed by rubber tubing 49.

The beam 46, which it will be noted is cantilevered rearwardly from the carriage, carries a T-shaped clamp 50, the stem of which passes freely through a vertical hole in the beam 46 and is urged downwardly by a spring 51. The cross of the T-shaped clamp 50 will, when turned into alignment with the conveyer, extend over the rods 47 and be urged theretoward by the spring 51. The cross of the T clamp is also jacketed by rubber tubing.

On the other hand, the wheel-carrying unit 34 of the conveyer has a vertical open ended tubular post 52 (Fig. 8) extending upwardly from its base and preferably aligned with the axis of its carriage. Into the upper end of the tubular post 52 a wide slot 53 is cut longitudinally of the conveyer; also a narrower transverse slot 54 (Fig. 10). A cross pin 55 is disposed in the cross slot 54, and on it is pivotally mounted a pair of U-shaped wheel carriers 56, formed from channel strips. The cross pin 55 does not directly pass through the wheel carriers 56, but rather through an offset lug 57 welded between adjacent legs of the U-shaped wheel carriers 56. The purpose of the lug 57 is to space the wheel carriers 56 away from the pin so that when the carriers are thrown to the vertical dotted-line position of Fig. 8, they lie a little forwardly of the tubular post 52. The lower end of the lug 57 is cut square. A plug 58, slidable within the tubular post 52 and urged upwardly by a spring 59, bears against either the end or the side of the lug 57, and thereby holds the wheel carrier 56 in either horizontal or vertical position to which it may be selectively swung.

As shown in Fig. 9, the two U-shaped wheel carriers 56 are positioned with their adjacent ends spaced apart at the bottom by the lug 57, and thereabove by a spacing rod 60 welded therebetween. The ends of the legs of the U-shaped wheel carriers are forked, as at 61 (Fig. 8).

I have now described the structure of the conveyer I employ in my line assembly of bicycles. I shall now describe the functions of that structure and how it is employed in the assembly of bicycles, along with my method of assembling bicycles.

Referring now to Fig. 1, at station A there is a supply, on racks a, of bicycle frames, fenders and forks in assorted types, colors, sizes, finishes, etc. Unless there is to be a large continuous production on the assembly line of identical bicycles, it is advisable to work from shop orders individual to each bicycle to be assembled, each shop order being on a wired tag and listing all of the specifications for a given bicycle. In this way, bicycles may be assembled as the orders are received, and more or less in the order in which they are received, without having to wait until a large number of orders have accumulated for bicycles of a given set of specifications.

Assuming the assembling is done pursuant to individual shop orders, the workman at station A takes the shop order next in order and, pursuant to that order, selects a bicycle frame 65, a front fender 66f, a rear fender 66r, and a steering fork 67, which constitute a matched set as to such factors as color, size, type of bicycle, etc. These he brings to the conveyer and sets upon a conveyer section. The frame is mounted in vertical position upside down and transversely of the conveyer, upon the frame-carrying unit. This mounting is effected by slipping the seat post mast 65a of the bicycle frame over the frame mounting peg 44, as shown in Fig. 3 and detailed in Figs. 4, 6 and 7, with the key 44a entering the usual slot 65b in the seat post mast. The peg 44 supports the frame near its center of gravity and the long interengagement of the peg 44 with the mast 65a prevents the bicycle frame from rocking in any direction relative to the carriage 35, while the carriage 35 in turn is kept from rocking by its engagement with the channel track. The key 44a prevents rotation of the bicycle frame about the peg, so that the frame will be maintained transversely of the conveyer.

The workman at station A attaches the wired shop order 68 to the bicycle frame so that it will follow along the assembly line with that bicycle as instructions for workmen at succeeding stations.

The attendant at station A also sets the front and rear fenders 66f and 66r upon the respective fender supports 47. At this time the cross of the T clamp 50 has preferably been left in a position transverse to the conveyer; that is, parallel with the fender supports 47. The fender supports receive the underside of the crown of the fenders near the center of the arc of the fenders. Then the clamp 50 is pulled upwardly and turned to bring the cross over the crowns of the fenders, and then released whereupon the spring 51 pulls the cross down upon the fenders to hold them securely.

Further, the attendant at station A mounts the steering fork 67 on the frame-carrying unit 33 of the conveyer by holding it in partly inverted oblique position and slipping its open end over the stud 45.

The frame-carrying unit 33 thus passes on from station A carrying the bicycle frame, fenders and fork in the manner indicated in Figs. 3 to 7, inclusive. If the operations described at station A are more than one workman can handle, it is entirely feasible for two or more workmen to take turns in filling the frame, fender and fork requirements of successive orders.

Preferably, the assembly line system includes a counter 69 just beyond station A. The actuating bar 69a of the counter may be so positioned that it is moved by each bicycle frame traveling past the counter. This gives an accurate check on the number of bicycle assemblies started, and, since the bicycle frame cannot very well be lost from the conveyer, it also serves as an accurate check upon the number of bicycles assembled.

At station B a workman removes the frame from the conveyer and places the steering head over a post-like jig, with the frame in upright position, and affixes the saddle post bolt 70, with its washer and nut, and drills two holes in the steering post which are to receive the escutcheon screws. (Figs. 3 to 7, inclusive, show the saddle post bolt 70 in place, but it will be understood that it is not placed, in the routine described, until the bicycle frame reaches station B.)

The frame is then handed to another workman at station C, now affixes a name plate 71 with self-tapping escutcheon screws. (The attached name plate 71 may be seen in Fig. 11.)

This workman then hands the frame to the workman at station D.

The workman at station D places the steering head 65c upon one of two jigs under a hydraulic press d, and there press fits bearing races 72 at the upper and lower ends of the steering head. (These assembled bearing races are shown in Fig. 11.) This same workman at station D then turns the frame on its side and, using the other jig in the same hydraulic press, press fits the bearing races 73 into the ends of the crank hanger 65c.

At station E a workman—who may conveniently be either the workman at station D or the workman at station F—replaces the frame upon the frame-carrying unit 33 of the conveyer. The fenders and fork have remained on the frame-carrying unit 33 while the frame has been removed for operations at station B, C and D.

At station F, by a portable electric drill, a workman retaps the threads at the tips of the rear forks to clean any paint out of the threads, and threads the chain adjusting screws 74 into these holes. (This is shown in Fig. 11.)

By the time the frame-carrying unit 33 leaves station F, the frame, fork and fenders are carried thereby in the manner illustrated in Figs. 11 and 12, and the assembly upon the frame has been progressed to the extent indicated in Figs. 11 and 12. It will be noted that at this stage, the wheel carriers 56 of the associated wheel-carrying unit still remain in their down or horizontal positions.

At station G a workman picks, from bins g, a pedal crank 75, a sprocket therefor, and one pedal crank bearing cone therefor. He slips the cone upon the pedal crank to the end shaft portion thereof, threads the pedal crank through the central hole of the sprocket, and screws the cone tightly upon the threaded portion of the shaft section of the pedal crank, whereby to fix the cone and sprocket to the pedal crank. As usual, a laterally projecting lug on the arm of the pedal crank extends into a hole on the sprocket to relieve the clamping effect of the cone from the burden of taking the driving force of the pedal crank arm upon the sprocket. The crank-sprocket-cone assembly operation at station G is not performed on the frame nor on the conveyer. It may be done on a bench g'.

At station H the crank-sprocket-cone assembly is placed upon the horizontal wheel carriers 56 of the wheel-carrying unit 34, with the sprocket in a horizontal plane resting on top of the carriers and one arm of the pedal extending down between the adjacent U arms, as shown in Figs. 13 and 14. In this way the crank-sprocket-cone assembly is carried from its assembly station G to its installation station I.

At station I, a workman removes the crank-sprocket-cone assembly from the wheel-carrying unit 34 and, at the same time, he swings the wheel carriers thereof to their vertical position, as shown in Fig. 15.

At station I the workman slips the bearing ball and cone container of a ball bearing over the end of the crank remote from the sprocket and brings the ball bearing on to the previously mentioned assembled cone. Then the crank is threaded through the crank hanger 65c. The other ball bearing is then slipped over the pedal crank and seated in the race 73 at the end of the crank hanger remote from the sprocket, and a remote cone 78 is slipped over the crank and screwed on to the threaded portion of its shaft section with the aid of a spanner wrench.

At station J a washer is slipped over the arm of the pedal crank remote from the sprocket, and this is followed by a lock nut, which is turned to a proper point to lock the second cone in proper position to give only the required play for the crank pedal bearing.

The parts installed at station I and J are picked from bins i and j at those stations.

In passing from station J to station K, the conveyer travels up an inclined section 39a of the channel tracks 39 to a higher level, as shown in Fig. 2. This is to bring the bicycle frame at a higher elevation for convenience in installing the front fork 67. At the bottom of the incline, a workman at station J may swing the wheel carrier 56 to its upper position to avoid any danger of relative rocking of the frame-carrying unit 33 and the wheel-carrying unit 34, in turning on to and off from the inclined section of the track, resulting in the wheel carrier dislodging the fork.

At station K a workman removes the front fork 67 from its supporting peg on the conveyer and installs it in the steering head 56e of the frame, at the same time appropriately inserting the ball bearings in their containers at the top and bottom of the steering head and applying the cone and its adjusting nut 81 (taken from convenient bins k) on the threaded upper end of the steering fork, as shown in Fig. 16. Since the bicycle frame is mounted upside down on the conveyer and the fork has been also carried upside down by the conveyer, it is unnecessary for the workman to turn the fork end-for-end in installing it.

At station L, a washer and nut 82, commonly known as the head lock nut, are applied to the end of the shank of the steering fork, as shown in Figs. 16 and 17. No truss rods are illustrated, but if the fork employs truss rods, the truss rods are, at station L, mounted on the truss rod plates secured to the fork at station K.

At station M, one or more workmen remove the front and rear fenders 66f and 66r from the conveyer, and at a workman's bench m rivet the radial brace rods 83 thereto. The front fender is then replaced, not on the fender carrier, but within the front fork and resting in part upon the frame, as shown in Fig. 18. The rear fender is laid crosswise upon the wheel carrier, which by then has been pushed down to horizontal position.

At station N, a workman removes the rear fender from the conveyer and at a bench n affixes a tail reflector 84. He then either replaces the rear fender on the conveyer, as shown in Fig. 19, or hands it directly to the workman at station P.

At station O, a workman installs the front fender 66f upon the fork 67, as shown in Fig. 20.

At station P, which is on the opposite side of the conveyer, a workman installs the rear fender 66r upon the frame, as shown in Fig. 21.

At station Q, the screws at 85, with which the rear fender is secured to the crank hanger and to the rear fork, are tightened, and the chain 86—which is not yet a complete loop—is taken from a bin q and is temporarily hung upon the assembly, as shown in Fig. 22.

At station R, a workman takes a front wheel 87 and a rear wheel 88 from racks r, which are on the side of the conveyer toward the front of the bicycle. He either hands the rear wheel directly to the workman at station R', on the other side of the conveyer, or, if the latter is not immediately available, sets the rear wheel on the wheel holder. The workman at station R then installs the front wheel (Fig. 23).

At station R', a workman installs the rear wheel, closes the chain into a loop, and trains it over the crank hanger sprocket and rear wheel sprocket. If the rear wheel carries a coaster brake, the brake arm 89 is also fastened, at station R', to the rear fork, as shown in Fig. 23.

Figure 24:
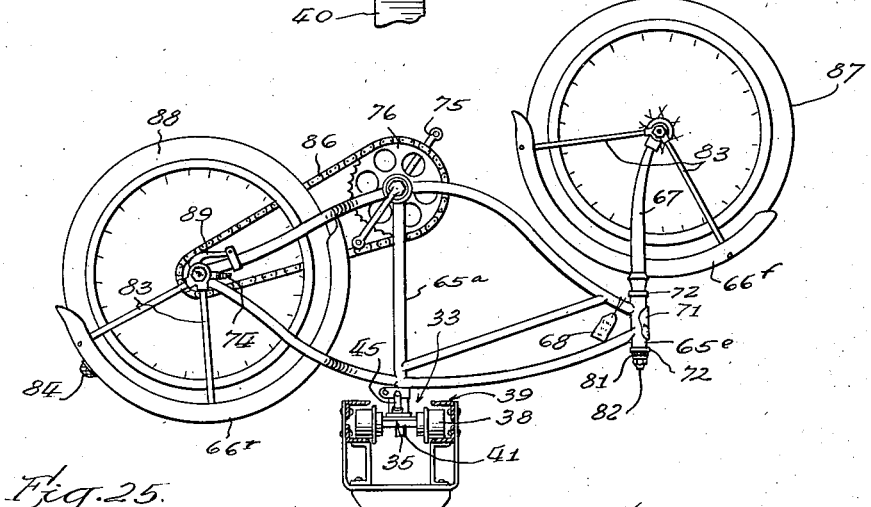
Fig. 24 is a transverse elevation of a conveyer unit at station S.

At station S, a workman (whose work may somewhat overlap that of the workman at station R') pulls the rear wheel back to tighten the chain, tightens the axle nuts on the rear wheel, and turns up the chain adjusting nuts 74 to proper position, giving the rear axle nuts their final turns (Fig. 24).

At stations T and U, such accessories as are called for by the shop order 68 are selected from bins or racks $t$ and $u$. These may include chain guards, lights, bells or horns, tool boxes, luggage carriers, and the like, as are to be assembled at the factory, instead of being shipped unattached.

At station V, the assembled bicycle is lifted from the conveyer, turned right side up, set on the floor, and wheeled to a packaging room where it may be placed within a relatively flat rectangular carton along with individually packaged pedals and the handle bars. The pedals and handle bars are not assembled on the assembly line ordinarily, because their addition would make the assembled bicycle too wide for as flat a shipping carton as is desirable. However, where this would not be an objection, I contemplate that the pedals and the handle bars can be assembled while the bicycle is on the conveyer.

I have mentioned that at 39a the channel tracks 39 for the conveyer travel upwardly. They may continue throughout the remainder of the assembly line at that elevation, or, as I prefer, they may descend again at 39b to their original level at station A.

Figure 25:
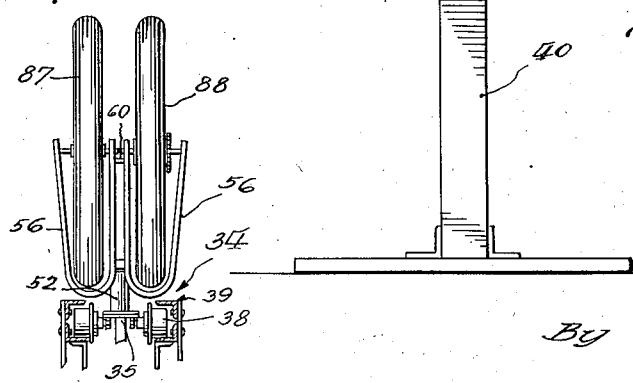
Fig. 25 is a transverse section showing a modified use of my conveyer for carrying the bicycle wheels.

I have referred to the conveyer carriers 56 as wheel carriers. That is because they are formed with bifurcated upper ends in which, when the carriers are turned to their upstanding positions, the protruding ends of the wheel axles may be rested so that each carrier 56 will carry a front wheel and a rear wheel, as shown in Fig. 25.

Where the wheel rims are, as a rule, supplied with a metal finish—as happens to be the current trend—it may not be necessary to carry the wheels for any considerable distance on the conveyer before they are installed, and that is the way I have described my assembly system. But, where the wheel rims are to come in colors matching the colors of the frames, fenders and forks, it becomes necessary to rack a large assortment of wheels in the various colors being offered. That supply of wheels might then become too large to make it feasible to carry all that stock at station R or to subject the workman at station R to the added duties of walking farther and selecting wheels of the color called for on the shop order. In that event, my assembly system, as previously described, would be modified. The wheels would be stored in the racks $a$, along with the frames, fenders and forks. A workman at station A would select the proper wheels and place them on the wheel carriers—then in upstanding position—at station A, and the wheel would be carried along on the wheel carriers of the conveyer from station A to stations R and R', when they would be removed for installation on the frames. In that event, of course, the cranks and rear fenders would not be temporarily rested on the horizontal wheel carriers, but in some other convenient place on the conveyer.

My line assembly method, with its peculiarities making the line assembly applicable to bicycles, and my conveyer system for carrying out that method, offer many advantages as compared with line assemblies generally.

Those components which have to be matched, and consequently selected from a relatively large stock—such as the frames, fenders and forks (and perhaps the wheels)—are stored at a preliminary station where space is not required for workmen engaged in the actual assembly. Also, the matched components are placed upon a section of the conveyer assigned to a given bicycle, and they remain associated with that section until the bicycle assembly is completed and removed from the conveyer. This, in a large measure, frees the assembly workmen from the necessity of taking time to walk back along long supply racks to select the required parts which vary with different bicycles going through the assembly line. The components of the bicycle may be removed for operations thereon while the other components still stay on the conveyer section assigned to that bicycle. For example, the frame is removed at an early stage in the assembly for operations to be performed thereon, and is then returned to the same conveyer section from which it was removed, while the other component parts of the bicycle have stayed on and traveled with that conveyer section. Somewhat similarly, the fenders are removed from that conveyer section for operations to be performed on them, and then they are returned to that conveyer section while the frame remains on the section.

The conveyer, considered as a chain, and the track for the conveyer, occupy but little cross-sectional area, and that at a height sufficient to allow free floor space—save for an occasional supporting standard 40—and at a height which does not interfere with the workmen.

Also, the frame on which the parts are installed is disposed transversely of the conveyer and its line of travel so that the front and rear ends of the frame—where most of the installation work is to be performed—extend laterally of the conveyer a considerable distance where they are conveniently accessible to workmen from all sides, without interference by close proximity of the conveyer and its track.

The transversely extending frames are spaced far enough apart for workmen to walk along, at the slow speed of the conveyer, between the bicycle frames, so that the workmen may stand behind the frame on which they are working and walk along forwardly, instead of more awkward sidestepping or backstepping. Despite the modest cross-sectional area occupied by the conveyer and its track, the frame is supported quite rigidly, so that the workmen, in installing parts thereon, can press against the frame in all directions, without being bothered by undue give or loosening of the frame or danger of dislodging it.

While I have described and illustrated these specific embodiments of my invention, I contemplate that many changes and substitutions may be made without departing from the scope and spirit thereof.

I claim:

1. An assembly line articulated conveyer for bicycle fabrication comprising a chain of conveyer sections coupled together at their ends and adapted to ride on transversely spaced horizontal ways, each conveyer section including an upwardly protruding peg adapted to be received in the seat post socket of an inverted bicycle frame to support the frame and conformed to engage a notch in the seat post mast to maintain the frame non-rotatably transversely of the conveyer, said conveyer section also including a second upwardly protruding peg for reception in the hollow shank of an inverted front fork of the bicycle to mount and carry the fork upon the section along with the frame.

2. An assembly line conveyer for bicycle fabrication, comprising a chain of conveyer sections coupled together at their ends and adapted to ride on transversely spaced horizontal ways, each conveyer section including an upwardly protruding peg adapted to be received in the seat post socket of an inverted bicycle frame to support the frame and conformed to engage the seat post mast to maintain the frame non-rotatably transversely of the conveyer, each conveyer section also including means for mounting a pair of fenders transversely of the conveyer but unattached to the frame, to travel along with the frame for subsequent installation thereon.

3. An assembly line conveyer for bicycle fabrication, comprising a chain of conveyer sections coupled together at their ends and adapted to ride on transversely spaced horizontal ways, each conveyer section including an upwardly protruding peg adapted to be received in the seat post socket of an inverted bicycle frame to support the frame and conformed to engage the seat post mast to maintain the frame non-rotatably transversely of the conveyer, each conveyer section also including means for receiving and mounting a fork and a pair of fenders, unattached to the frame, to travel therewith for subsequent installation upon the frame.

4. A conveyer according to claim 2, wherein the fender supporting means consists of an upwardly presented surface conformed to receive the underside of the fenders near their mid points and a T clamp carried by the conveyer section, the stem of the T being arranged vertically to extend between the fenders and the cross bar of the T being horizontally disposed longitudinally of the conveyer to rest upon the tops of the fenders, and spring means acting on the stem to press the cross bar downwardly upon the fenders to hold them on their supports, the T clamp being rotatable whereby, when it is pulled upwardly, it may be turned and parked transversely of the conveyer when not in use.

5. In a conveyer for use in bicycle assembly, the combination of a plurality of spaced supporting columns, said supporting columns being provided with a pair of upwardly extending supporting legs at their upper ends, a pair of opposed track members carried by said legs in spaced relation to each other, said track members each having a lower wheel-supporting flange, and said flanges extending toward each other, and an upper wheel-confining flange, said latter flanges also extending toward each other, a plurality of carriages carried by said track members, each of said carriages comprising a supporting body having a pair of laterally extending trunnions at each end of said body, flanged wheels carried by said trunnions and located to engage the edges of said flanges, the flanges of said track members being spaced sufficiently to receive said wheels for rolling engagement with the first-mentioned of said flanges, said wheels being confined against tilting movement of said carriage by the upper wheel-confining flanges, a chain of the sprocket type having solid links and spaced links pivoted together upon pintles extending transversely to said trunnions, each of said carriages having a depending frame member pivotally connected to sections of said chain by pintles extending substantially parallel to said trunnions, and means carried by said carriage for rigidly supporting a bicycle frame on said carriage in a plane extending transversely to the direction of motion of said conveyer.

6. In a conveyer for use in bicycle assembly, the combination of a plurality of spaced supporting columns, said supporting columns being provided with a pair of upwardly extending supporting legs at their upper ends, a pair of opposed track members carried by said legs in spaced relation to each other, said track members each having a lower wheel-supporting flange, and said flanges extending toward each other, and an upper wheel-confining flange, said latter flanges also extending toward each other, a plurality of carriages carried by said track members, each of said carriages comprising a supporting body having a pair of laterally extending trunnions at each end of said body, flanged wheels carried by said trunnions and located to engage the edges of said flanges, the flanges of said track members being spaced sufficiently to receive said wheels for rolling engagement with the first-mentioned of said flanges, said wheels being confined against tilting movement of said carriage by the upper wheel-confining flanges, a chain of the sprocket type having solid links and spaced links pivoted together upon pintles extending transversely to said trunnions, each of said carriages having a depending frame member pivotally connected to sections of said chain by pintles extending substantially parallel to said trunnions, and means carried by said carriage for rigidly supporting a bicycle frame on said carriage in a plane extending transversely to the direction of motion of said conveyer, said latter means comprising an upwardly projecting substantially cylindrical member adapted to have a substantial fit in the saddle post socket of a bicycle frame.

7. In a conveyer for use in bicycle assembly, the combination of a plurality of spaced supporting columns, said supporting columns being provided with a pair of upwardly extending supporting legs at their upper ends, a pair of opposed track members carried by by said legs in spaced relation to each other, said track members each having a lower wheel-supporting flange, and said flanges extending toward each other, and an upper wheel-confining flange, said latter flanges also extending toward each other, a plurality of carriages carried by said track members, each of said carriages comprising a supporting body having a pair of laterally extending trunnions at each end of said body, flanged wheels carried by said trunnions and located to engage the edges of said flanges, the flanges of said track members being spaced sufficiently to receive said wheels for rolling engagement with the first-mentioned of said flanges, said wheels being confined against tilting movement of said carriage by the upper wheel-confining flanges, a chain of the sprocket type having solid links and spaced links pivoted together upon pintles extending transversely to said trunnions, each of said carriages having a depending frame member pivotally connected to sections of said chain by pintles extending substantially parallel to said trunnions, and means carried by said carriage for rigidly supporting a bicycle frame on said carriage in a plane extending transversely to the direction of motion of said conveyer, said latter means comprising an upwardly projecting substantially cylindrical member adapted to have a substantial fit in the saddle post socket of a bicycle frame, said cylindrical member being provided with a radially projecting lug located to engage in a crack in the wall of the saddle post socket.

8. In a conveyer for use in bicycle assembly, the combination of a plurality of spaced supporting columns, said supporting columns being provided with a pair of upwardly extending supporting legs at their upper ends, a pair of opposed track members carried by said legs in spaced relation to each other, said track members each having a lower wheel-supporting flange, and said flanges extending toward each other, and an upper wheel-confining flange, said latter flanges also extending toward each other, a plurality of carriages carried by said track members, each of said carriages comprising a supporting body having a pair of laterally extending trunnions at each end of said body, flanged wheels carried by said trunnions and located to engage the edges of said flanges, the flanges of said track members being spaced sufficiently to receive said wheels for rolling engagement with the first-mentioned of said flanges, said wheels being confined against tilting movement of said carriage by the upper wheel-confining flanges, a chain of the sprocket type having solid links and spaced links pivoted together upon pintles extending transversely to said trunnions, each of said carriages having a depending frame member pivotally connected to sections of said chain by pintles extending substantially parallel to said trunnions, and means carried by said carriage for rigidly supporting a bicycle frame on said carriage in a plane extending transversely to the direction of motion of said conveyer, said latter means comprising an upwardly projecting substantially cylindrical member adapted to have a substantial fit in the saddle post socket of a bicycle frame, said cylindrical member being provided with a radially projecting lug located to engage in a crack in the wall of the saddle post socket, certain of said carriages being provided with bicycle frame carriers and other of said carriages being provided with wheel carriers.

9. In a conveyer for use in bicycle assembly, the combination of a plurality of spaced supporting columns, said supporting columns being provided with a pair of upwardly extending supporting legs at their upper ends, a pair of opposed track members carried by said legs in spaced relation to each other, said track members each having a lower wheel-supporting flange, and said flanges extending toward each other, and an upper wheel-confining flange, said latter flanges also extending toward each other, a plurality of carriages carried by said track members, each of said carriages comprising a supporting body having a pair of laterally extending trunnions at each end of said body, flanged wheels carried by said trunnions and located to engage the edges of said flanges, the flanges of said track members being spaced sufficiently to receive said wheels for rolling engagement with the first-mentioned of said flanges, said wheels being confined against tilting movement of said carriage by the upper wheel-confining flanges, a chain of the sprocket type having solid links and spaced links pivoted together upon pintles extending transversely to said trunnions, each of said carriages having a depending frame member pivotally connected to sections of said chain by pintles extending substantially parallel to said trunnions, an upwardly extending rigid column carried by the body of one of said carriages, a pair of substantially U-shaped metal members fixedly secured together and provided with forked ends for receiving the axles of a pair of wheel assemblies, and means for supporting said U-shaped members on said column in substantially vertical position.

10. In a conveyer for use in bicycle assembly, the combination of a plurality of spaced supporting columns, said supporting columns being provided with a pair of upwardly extending supporting legs at their upper ends, a pair of opposed track members carried by said legs in spaced relation to each other, said track members each having a lower wheel-supporting flange, and said flanges extending toward each other, and an upper wheel-confining flange, said latter flanges also extending toward each other, a plurality of carriages carried by said track members, each of said carriages comprising a supporting body having a pair of laterally extending trunnions at each end of said body, flanged wheels carried by said trunnions and located to engage the edges of said flanges, the flanges of said track members being spaced sufficiently to receive said wheels for rolling engagement with the first-mentioned of said flanges, said wheels being confined against tilting movement of said carriage by the upper wheel-confining flanges, a chain of the sprocket type having solid links and spaced links pivoted together upon pintles extending transversely to said trunnions, each of said carriages having a depending frame member pivotally connected to sections of said chain by pintles extending substantially parallel to said trunnions, an upwardly extending rigid column carried by the body of one of said carriages, a pair of substantally U-shaped metal members fixedly secured together and provided with forked ends for receiving the axles of a pair of wheel assemblies, and means for supporting said U-shaped members on said column in substantially vertical position and for permitting the pivotal movement of said U-shaped members to substantially horizontal position for the support of other bicycle subassemblies.

11. In a carriage assembly for a bicycle conveyer, the combination of a supporting body provided with four substantially parallel trunnions, a driving post depending from said body and having pintle connections substantially parallel to said trunnions for connection to sprocket chain sections, flanged wheels carried by said trunnions for engagement with guide members above and below the guide wheels, a bicycle frame supporting column rigidly secured to said body member and extending substantially vertically therefrom, said bicycle supporting column comprising a cylindrical member adapted to be received in the saddle post mast socket.

12. In a carriage assembly for a bicycle conveyer, the combination of a supporting body provided with four substantially parallel trunnions, a driving post depending from said body and having pintle connections substantially parallel to said trunnions for connection to sprocket chain sections, flanged wheels carried by said trunnions for engagement with guide members above and below the guide wheels, a bicycle frame supporting column rigidly secured to said body member and exteding substantially vertically therefrom, said bicycle supporting column comprising a cylindrical member adapted to be received in the saddle post mast socket, said column having a laterally projecting lug adapted to be received in a crack in the wall of said socket for preventing rotation of a bicycle frame on the column and for holding the frame in substantial parallelism with said trunnions.

13. In a carriage assembly for a bicycle conveyer, the combination of a supporting body provided with four substantially parallel trunnions, a driving post depending from said body and having pintle connections substantially parallel to said trunnions for connection to sprocket chain sections, flanged wheels carried by said trunnions for engagement with guide members above and below the guide wheels, a bicycle frame supporting column rigidly secured to said body member and extending substantially vertically therefrom, said bicycle supporting column comprising a cylindrical member adapted to be received in the saddle post mast socket, and a second column member adapted to be received by the open end of a bicycle steering fork.

14. In a carriage assembly for a bicycle conveyer, the combination of a supporting body provided with four substantially parallel trunnions, a driving post depending from said body and having pintle connections substantially parallel to said trunnions for connection to sprocket chain sections, flanged wheels carried by said trunnions for engagement with guide members above and below the guide wheels, a bicycle frame supporting column rigidly secured to said body member and extending substantially vertically therefrom, said bicycle supporting column comprising a cylindrical member adapted to be received in the saddle post mast socket, and a laterally projecting frame member carried by said body member, a pair of fender supporting members carried by said latter frame member, and resilient means for holding fenders on said fender supporting members.

15. In a conveyer system for bicycle assembly, the combination of a plurality of supporting carriages, each of said carriages having a body and four substantially parallel laterally projecting trunnions, flanged wheels carried by said trunnions, guide members for said flanged wheels, said guide members having lower flanges for rolling support of said wheels, and upper flanges for confining said carriages against tilting, a plurality of sprocket chain sections for connecting and driving said carriages and forming a closed loop conveyer, and rigid means carried by said body member, comprising an upwardly extending supporting column, said column being adapted to be received in a bicycle saddle post socket, and a radially projecting lug carried by said column for engaging in a complementary recess in said socket for rigidly holding a bicycle frame transversely to the direction of movement of said carriage.

FRANK W. SCHWINN.